United States Patent
Levine et al.

(10) Patent No.: US 7,129,975 B2
(45) Date of Patent: Oct. 31, 2006

(54) ADDRESSABLE IMAGER WITH REAL TIME DEFECT DETECTION AND SUBSTITUTION

(75) Inventors: Peter Alan Levine, West Windsor, NJ (US); Nathaniel Joseph McCaffrey, Stockton, NJ (US)

(73) Assignee: Dialog Imaging System GmbH, Kirchheim/Teck-Nabern (DE)

( * ) Notice: Subject to any disclaimer, the term of this patent is extended or adjusted under 35 U.S.C. 154(b) by 735 days.

(21) Appl. No.: 10/043,768

(22) Filed: Jan. 10, 2002

(65) Prior Publication Data

US 2002/0105579 A1   Aug. 8, 2002

Related U.S. Application Data

(60) Provisional application No. 60/267,005, filed on Feb. 7, 2001.

(51) Int. Cl.
*H04N 9/64* (2006.01)
(52) U.S. Cl. .................................................. 348/246
(58) Field of Classification Search ................ 348/241, 348/246, 247, 294, 308
See application file for complete search history.

(56) References Cited

U.S. PATENT DOCUMENTS

| | | | |
|---|---|---|---|
| 4,253,120 A | 2/1981 | Levine | |
| 4,535,359 A | 8/1985 | Fearnside | |
| 5,327,246 A * | 7/1994 | Suzuki | 348/246 |
| 5,920,345 A | 7/1999 | Sauer | |
| 5,949,918 A | 9/1999 | McCaffrey | |
| 5,969,758 A | 10/1999 | Sauer et al. | |
| 6,052,159 A | 4/2000 | Ishii et al. | |
| 6,101,294 A | 8/2000 | McCaffrey et al. | |
| 6,259,478 B1 | 7/2001 | Hori | |
| 6,683,643 B1 * | 1/2004 | Takayama et al. | 348/247 |
| 2002/0149683 A1 * | 10/2002 | Post | 348/246 |
| 2004/0169746 A1 * | 9/2004 | Chen et al. | 348/246 |

* cited by examiner

*Primary Examiner*—Tuan Ho
(74) *Attorney, Agent, or Firm*—RatnerPrestia (57) ABSTRACT

A video imaging system includes an imaging array having a plurality of picture elements (pixels) formed in a substrate. An analog to digital converter formed in the substrate converts signals from the pixels into digital pixel signals. A defect detection circuit formed in said substrate provides a defective pixel output signal indicating, as the digital pixel signal corresponding to the pixels is processed, if any one pixel of the plurality of pixels in the imaging array is defective. The video imaging system includes a defect substitution circuit, also formed in the substrate, that substitutes a corrected pixel for any defective pixel. The video imaging system is responsive to a gain control signal to adjusts the pixels in magnitude. The gain control signal is applied to the first circuit to control the analysis of the pixel to determine if it is defective.

17 Claims, 5 Drawing Sheets

ADDRESSABLE IMAGER WITH REAL TIME DEFECT DETECTION AND SUBSTITUTION

CROSS-REFERENCE TO RELATED APPLICATIONS

This application claims the benefit of U.S. Provisional Application No. 60/267,005, filed Feb. 7, 2001, the contents of which are incorporated herein by reference.

FIELD OF THE INVENTION

The present invention is directed to an x-y addressable video imaging system with real time defect detection and substitution, and, more particularly to such an imaging system in which the imager and the defect detection and correction circuits are on the same substrate.

BACKGROUND OF THE INVENTION

Defects in the individual picture element (pixel) cells that constitute a video imager, unless corrected, may cause defects in the output images produced by the imager. These defects may appear as bright spots or lines in an otherwise dark image or dark spots or lines in an otherwise bright image. Because video imagers typically include a large number of pixel cells, it is difficult to produce imagers that are free of such defects.

One way of effectively increasing the yield of imagers is to substitute a corrected signal component for that produced by any individual defective element of an imager. However, before such a correction can take place, it is necessary to detect those elements of the imager which are defective.

One proposed solution to this problem involves (1) analyzing the output signal from an imager, in the absence of an image, to detect the location of each then-existing defective element, (2) permanently storing the location of each defective element in a memory which is associated with the imager, and (3) during subsequent use of the imager, substituting a corrected signal for the signal produced by each defective element as determined by its location stored in the memory. This proposed solution may be impractical because many defects are temperature dependent. Therefore, defective elements present during subsequent use of the imager may not have been present at the time of analysis and storage of the location of defective elements in the memory. In any case, the requirement for a memory associated with the imager increases the cost of a solid-state television camera employing this proposed solution to the problem of defective imager elements.

Many systems exist which detect defective pixels in an imager array with reference to a test pattern or other fixed image. For examples, dark current defects in an imager may be detected by analyzing the image obtained when the camera's lens is capped. Similarly, defects that cause dark pixels may be detected by imaging a flat white test card. Errors detected by these methods must be stored so that they may be corrected when the camera captures active video images.

U.S. Pat. No. 4,253,120 to Peter A. Levine, entitled DEFECT DETECTION MEANS FOR CHARGE TRANSFER IMAGER, describes circuitry for determining and correcting defects in the pixels of an x-y imager using active video data. In the system described by this patent, a low-resolving power optical element is used to focus an image onto an imager that has a higher resolution than the resolving power of the optics. The difference between the resolution of the imager and the resolving power of the lens is used to distinguish errors in the imager array from transitions in the image. The referenced patent describes a charge-coupled device (CCD) imager array, which is formed on one substrate, and a correction circuit, which is formed on a separate substrate. Because the imager and the correction circuit are on separate substrates, the device is difficult to make, requiring two integrated circuit fabrications, and is relatively large in size.

SUMMARY OF THE INVENTION

The present invention is embodied in a video imaging system formed on a single substrate, the video imaging system includes an imaging array having a plurality of picture elements (pixels). Each pixel is adapted to receive light and convert the light to an electrical signal. An analog to digital converter formed in said substrate converts the electrical signals from the pixels into digital pixel signals and a first circuit formed in said substrate analyzes the pixel signals to provide a defective pixel output signal indicating, as the digital pixel signal corresponding to the pixels is processed, if any one pixel of the plurality of pixels in the imaging array is defective.

According to another aspect of the invention, the video imaging system includes a second circuit, also formed in the substrate, that substitutes a corrected pixel for any pixel indicated as being defective by the first circuit. The corrected pixel may be generated by a histogramming circuit, a filter having a frequency response characteristic that approximates a modulation transfer function of the image formed on the imaging array, a median filter or an averaging filter.

According to yet another aspect of the invention, the video imaging system includes a gain control circuit, formed in the substrate, that adjusts the magnitude of the pixels in response to a gain control signal and the gain control signal is applied to the first circuit to control the analysis of the pixel to determine if it is defective.

DETAILED DESCRIPTION OF THE EXEMPLARY EMBODIMENTS

Figures 1, 2B:
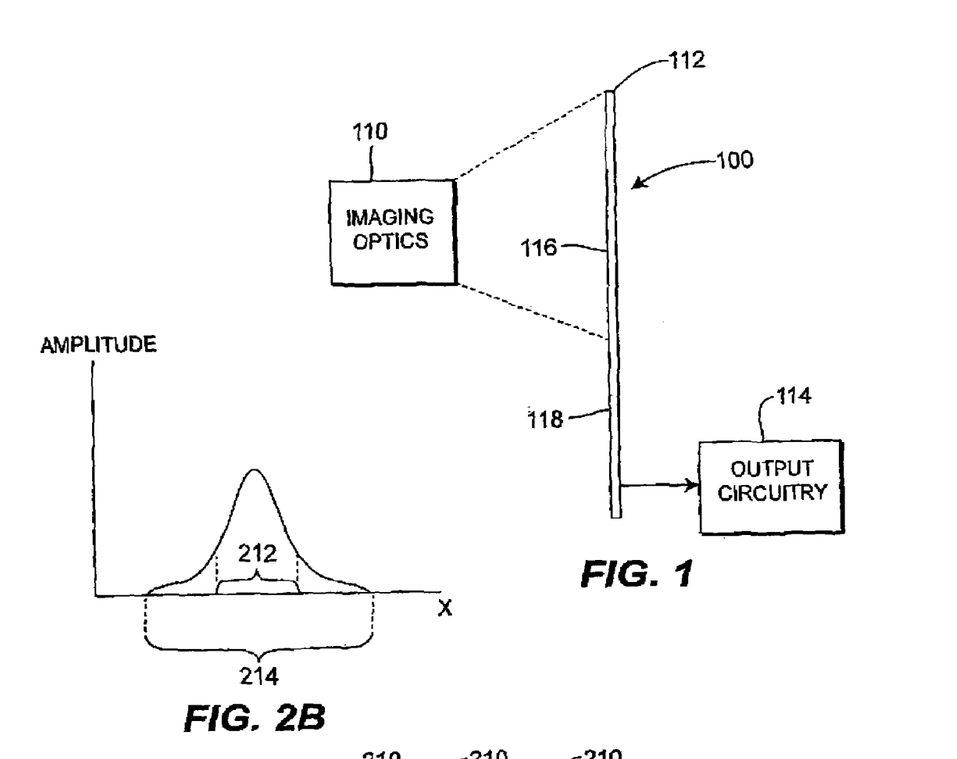
FIG. 1 is a block diagram of a solid state imaging system in which the present invention.
FIG. 2B is a graph of amplitude versus distance that is useful for describing the point spread function of the illuminated pixel shown in FIG. 2A.

FIG. 1, shows a solid state video imaging system 100 which incorporates an imager 116 and correction circuitry formed on a single substrate 112 according to the present invention. The substrate 112 is shown in a side-plan view. The imaging system 100 comprises imaging optics 110 which receives the light from the scene to be imaged and focuses the light the imager 116. The imaging system 100 also includes correction circuitry 118 which detects and corrects individual pixel errors in active video images produced by the imager array 116. In addition, the system 100 includes output circuitry 114 which processes the corrected image for display.

Imaging optics 110 may be composed of a combination of optical elements, which optical elements may include lenses, mirrors, lenticular arrays and/or aperture plates, by way of example. By a suitable choice of these optical elements, the numerical aperture, resolving power and spatial frequency filtering characteristics of imaging optics 110 may be selected. Due to the interaction of light with the optics 110 and the semiconductor surface, it is difficult to provide an optical system that illuminates only one pixel. Even if the optical system is designed to produce a very small spot on a single pixel, light from the spot may be diffused into adjacent pixels either by diffraction in the optics or by the semiconductor material that is used to form the imaging device. Thus, the combined modulation transfer function of the optical system and the imager array typically spreads light across several pixels. The amount of light that is diffracted or diffused by the optics and/or semiconductor material may be small compared to the amount that is focused on the pixel but it is still more than is provided by a single defective pixel.

Another way of expressing the modulation transfer function is as a point-spread function. The point-spread function defines an area around a pixel in which signal can be detected. In a defective pixel, the signal is confined entirely within the pixel, resulting in a tightly-confined point-spread function. For an illuminated pixel, measurable signal may extend beyond the boundaries of the pixel resulting in a larger point-spread function.

This is especially true for back-illuminated imager arrays in which light or other types of radiation travels through the substrate before reaching the active pixel regions and for imager arrays that have field-free regions between the pixels. Defects such as white spots and black spots typically do not form in field-free regions. They only form in the field region of the pixel. Thus, for these two types of imager arrays, the point-spread function for an individual pixel is much tighter than the point-spread function of a spot of light focused on a single pixel of the imager. For front illuminated imager arrays and imager arrays that do not have field-free regions between the pixels, there is still a difference between the point-spread functions of the defective pixels and a single illuminated pixel but these differences may not be as large as for a back-illuminated imager or for an imager having field-free regions between the pixels.

In accordance with the principles of the present invention, the point-spread function of imager 116 is substantially higher than the point-spread function of a defective pixel so that single-pixel defects in the imager 116 may be distinguished from transitions in the image produced by the imaging optics 110.

Figure 2A:
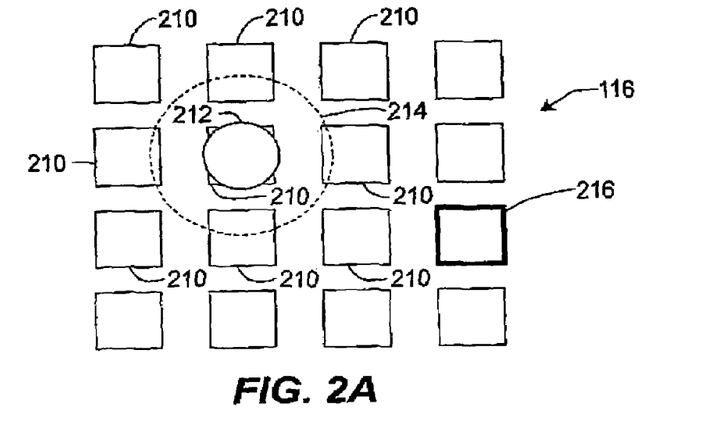
FIG. 2A is a partial front plan view of an imager array suitable for use with the present invention which shows several pixel elements.

FIG. 2A is a front-plan view of a portion of the imager array 116 which is useful for describing the difference in point-spread functions. FIG. 2 shows a plurality of pixel elements 210 and a minimum-size spot 212 produced by the imaging optics 110. As shown in FIG. 2A, although the minimum spot 212 is substantially confined to a single pixel, light energy, represented by the dashed-line circle 214 can be detected by more than one pixel element 210 of the imager array 116.

The point-spread function of the spot 212 is shown in FIG. 2B. As shown in this Figure, the central area 212, corresponding to the active area of the pixel 210, is illuminated strongly but significant light energy 214 is spread among the adjacent pixels. The graph shown in FIG. 2B is not to scale but is exaggerated to illustrate the spread of light among adjacent pixels. As described above, this spread may be caused by the optics 110 or by diffraction and/or diffusion of light energy in the semiconductor material from which the imaging array is formed.

Also shown in FIG. 2A is a defective pixel 216. The signal from the defective pixel is substantially confined to the pixel 216 and is not seen as detectable energy in any of the adjacent pixels. Thus, a minimum-size feature of the focused image represents a more gradual transition among adjacent pixels than a defective pixel.

Figure 3:
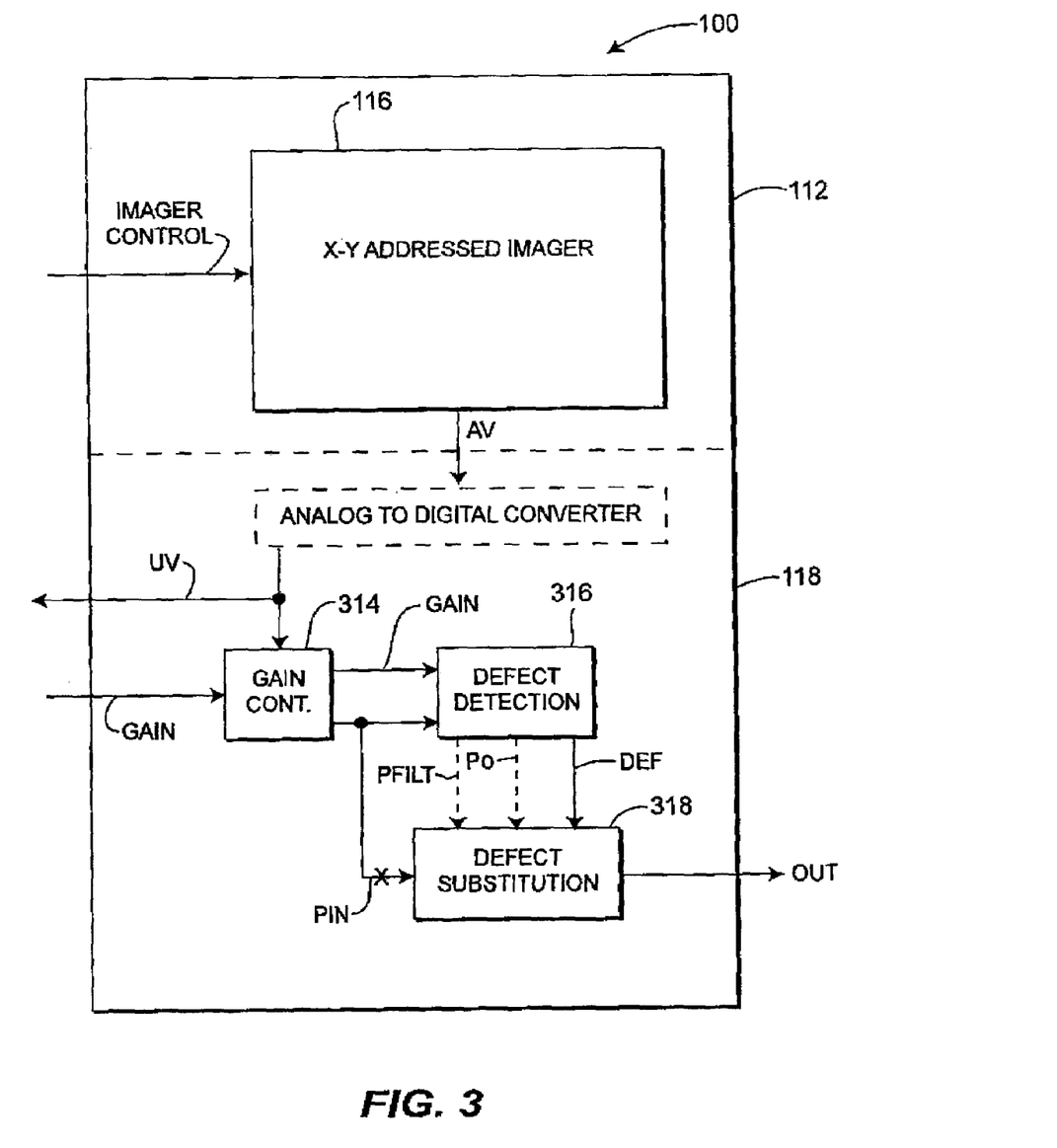
FIG. 3 is a block diagram of a x-y addressable imager having the detection and correction circuitry according to the present invention.

Referring to FIG. 3, the imaging system 100 comprises a substrate 112 of a semiconductor material, such as silicon. The imager array 116 and the correction circuitry 118 formed in the substrate as a single integrated circuit. In the exemplary embodiment of the invention, the imager array may be a CMOS imager such as is described in U.S. Pat. No. 5,920,345 to Sauer entitled CMOS IMAGE SENSOR WITH IMPROVED FILL FACTOR. Typical CMOS imagers generally include a plurality of pixels arranged in rows and columns. Each pixel generally includes an active region 210 (shown in FIG. 2) that receives light and converts the light to an electric charge. Each pixel 210 also generally includes a MOS transistor (not shown) which is used to amplify the accumulated charge from the pixel to an output port of the imager. A first set of conductors (not shown) extend between and parallel to the rows of the pixels and a second set of conductors (not shown) extend between and parallel to the columns of the pixels. This provides for x-y addressing of the pixels so that the electrons from the pixels may be provided to the output port one row at a time.

Also formed in the substrate 112 is the correction circuitry 118 including an analog to digital converter (ADC) circuit 312, which may be any of several well know types utilizing CMOS technology. An exemplary ADC is described in U.S. Pat. No. 5,272,481 entitled SUCCESSIVE APPROXIMATION ANALOG TO DIGITAL CONVERTER EMPLOYING PLURAL FEEDBACK DIGITAL TO ANALOG CONVERTERS. The imager array 116 provides an analog video signal, AV, to the ADC 312. The ADC 312 digitizes the signal AV to provide an uncorrected video signal, UV. The signal UV is applied to digital gain circuitry 314 and, in the exemplary embodiment of the invention, as an output signal of the imaging system 100. The gain circuitry 314 is also formed in the substrate 112 as a CMOS circuit. The exemplary gain circuit 314 receives an external gain signal, GAIN, which determines the amount of amplification or attenuation that is applied to the signal UV to generate the gain-adjusted video signal PIN. Exemplary digital gain circuitry is described below with reference to FIGS. 8A and 8B.

Figure 8A:
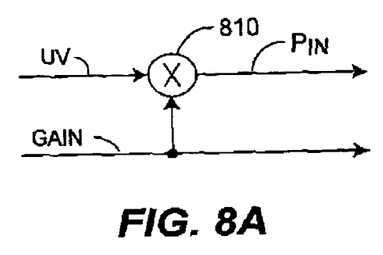
FIGS. 8A and 8B are block diagrams of alternate embodiments of circuitry suitable for use as the digital gain circuitry shown in FIG. 3.
Figure 8B:
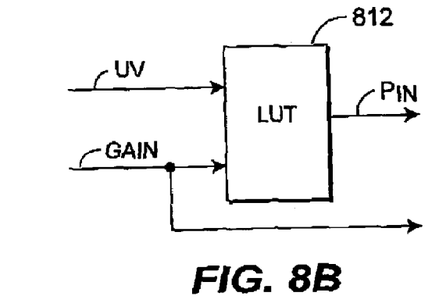

FIG. 8A includes a digital multiplier 810 which simply multiplies the uncorrected video signal UV by the signal GAIN. FIG. 8B replaces the digital multiplier by a look-up table (LUT) 812, which is addressed by the values of the pixel signal UV and the signal GAIN to effectively multiply the signals UV and GAIN. For certain types of signals it may be desirable to use the LUT 812 rather than the digital multiplier 810 because a wider range of gain functions may be implemented using the LUT than are possible using the multiplier (e.g. the gain function may be non-linear to perform contrast enhancement or to implement gamma correction).

The digital gain circuitry 314 applies the signals PIN and GAIN to the defect detection circuitry 316 and applies the signal PIN to the defect substitution circuitry 318. As described below, the defect detection circuitry 316 identifies defective pixel values from the gain-adjusted pixel signal PIN provided by the digital gain circuitry 314 and provides a signal DEF indicating that a defective pixel has been identified. The defect substitution circuitry 138 calculates a substitute pixel value for the current pixel value being provided by the system 100 and provides either the signal PIN or the substitute pixel value responsive to the signal DEF.

In the operation of the video imaging system 100, the scene image is projected on the x-y imager 116 through the optics 110 (all shown in FIG. 1). As described above, the image of a point source projected onto the imager 116 has energy which encompasses multiple neighboring pixels. The real time pixel rate signal is analyzed by the on-chip circuits which make the determination based on modulation transfer function (MTF) or point spread, if a white or black pixel is defective or due to scene content. The defect detector 38 separates scene content from defective pixel induced signal by real time comparison of a pixel with its neighbors. A pixel memory, and optionally one or more line memories, may be used for this comparison.

Figure 4:
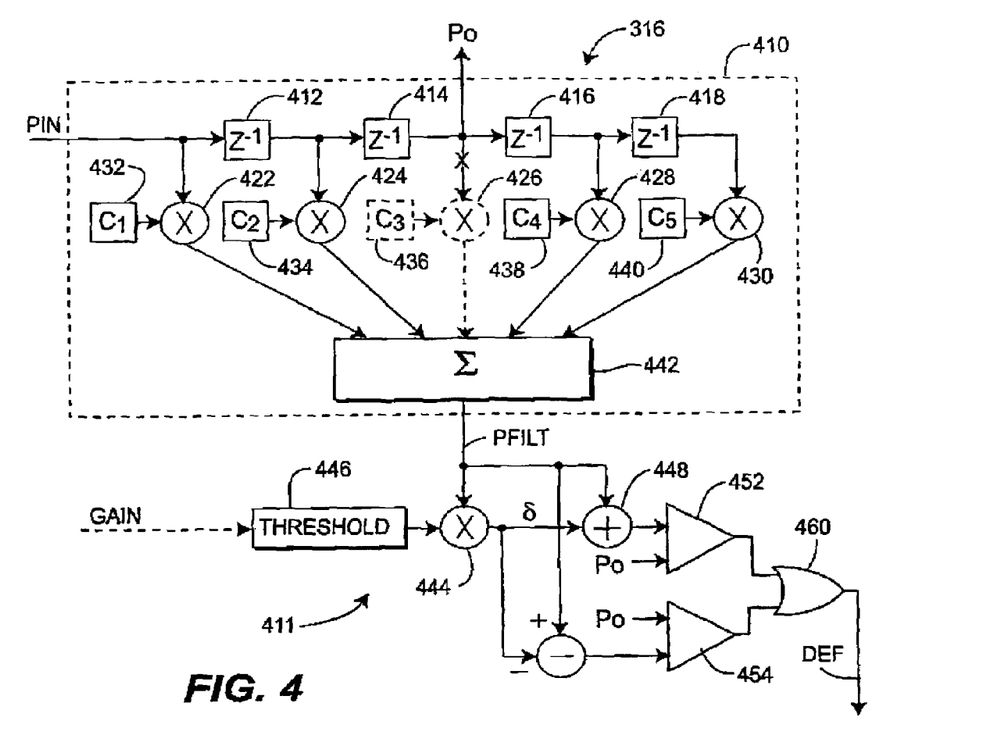
FIG. 4 is a block diagram of exemplary circuitry suitable for use as the defect detection circuitry shown in FIG. 3.

Exemplary defect detection circuitry 316 is shown in FIG. 4. The exemplary circuitry 316 includes a filter 410 and hysteresis circuitry 411 which compares a pixel value Po with the output signal provided by the filter to determine if the Po represents an erroneous value. In the exemplary embodiment of the invention, the filter 410 is a finite impulse response (FIR) filter that receives the gain-adjusted pixel signal PIN and provides an output signal PFILT. The exemplary filter includes four one-pixel period delay stages, 412, 414, 416 and 418 which provide four or five pixel values to four or five multipliers, 422, 424, 428, 430 and, optionally 426. The signal Po is the pixel signal provided by the delay element 414. In the exemplary embodiment of the invention, the signal Po may or may not contribute to the filtered pixel value, as indicated by the "x" on the input to the multiplier 426, shown in phantom. This prevents the pixel Po from distorting the filtered value when Po is defective.

These pixel values are five successive pixel values on a single line of the video signal. Each of the five multipliers is coupled to receive a respective coefficient value 432, 434, 438, 440 and, optionally 426. The output signals of the multipliers 422, 424, 428, 430 and, optionally, 426 are summed by a summing circuit 442 to produce the output value PFILT. In the exemplary filter shown in FIG. 4, the coefficients provide the filter with a frequency response characteristic that approximates the spatial frequency response characteristic (i.e. the modulation transfer function) of the optics 110. The exact values of the coefficients depend on the frequency response characteristic of the optics 110 and can be readily determined by one of ordinary skill in the art. It is contemplated that the filter 410 may be implemented to have a different frequency response characteristic. For example, each of the five coefficient values 432, 434, 436, 438 and 440 may be 0.2, so that the output signal provided by the filter is the arithmetic average of the five successive pixel values. Alternatively, the filter 410 may include a median filter (not shown) such that the signal PFILT is the median of the signal PIN and the signals provided by the delay elements 412, 416, 418 and, optionally, 414.

The exemplary hysteresis circuitry 411 includes a multiplier 444, that multiplies the signal PFILT, provided by the filter 410, by a threshold value 446 to generate a signal δ which is added to PFILT in an adder 448 and subtracted from PFILT in subtracter 450 to generate boundary signals. The boundary signals are compared to Po in the two comparators 452 and 454. If Po is greater than PFILT+δ or less than PFILT−δ then the pixel may represent an error. In the exemplary hysteresis circuitry 411, the output signals of the comparators 452 and 454 are applied to an OR gate 460 to generate the output signal DEF of the defect detection circuitry 316. In an alternative embodiment of the invention, the value of the threshold 466 changes as a function of the signal GAIN, representing the amount of amplification or attenuation that is applied to the signal UV by the digital gain circuitry 314. In this alternative embodiment, the threshold circuit 446 may have the structure shown in FIG. 9.

Figure 9:
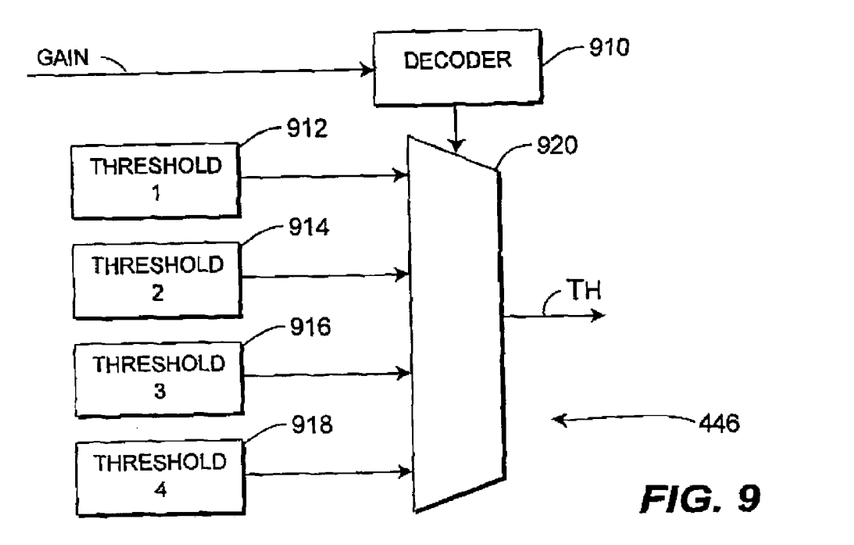
FIG. 9 is a block diagram of gain-dependent threshold circuitry suitable for use with the defect detection circuitry shown in FIG. 3.

The threshold circuit shown in FIG. 9 includes a digital decoder 910 that is coupled to receive the signal GAIN. The circuit 446 also includes a plurality of threshold values, for example, 912, 914, 916 and 918, and a multiplexer 920. The decoder 910 decodes the signal GAIN to select one of the threshold values 912, 914, 916 and 918 to apply to the multiplier 444 (shown in FIG. 4). The threshold value applied when the gain is relatively large is greater than the threshold value applied when the gain is relatively low. The decoder 910 divides the range of values for the signal GAIN into four sub-ranges, each corresponding to a respectively different threshold value. It is contemplated that the sub-ranges may represent a linear division of the range of the signal GAIN or some other division, for example a logarithmic division. It is also contemplated that the threshold values may increase linearly or by some other function, for example, exponentially.

The hysteresis circuitry 411 inhibits correction of defective pixels when the difference between the defective pixel value Po and the pixel value PFILT is less than the threshold value. For example, a black pixel in a dark area of the image is not corrected nor is a white pixel in a bright area of the image. Leaving these pixels uncorrected prevents loss of information that may be represented by the defective pixel.

Although the exemplary circuitry shown in FIG. 4 is a digital, it is contemplated that equivalent circuitry may be made using analog circuitry. In this alternative embodiment, the delay elements 412, 414, 416 and 418 may be implemented as sample-and-hold circuits (not shown). The multipliers 422, 424, 426, 428 and 430 may be implemented as amplifiers (not shown) where each amplifier is configured to have a gain corresponding to a respective one of the coefficients 432, 434, 436, 438 and 440. The summing circuit 422 may be a resistive summing network (not shown) as may the adder 448. The multiplier 444 may be a variable-gain amplifier (not shown) which receives an analog threshold signal at its gain input. The subtracter 450 may be replaced by a unity-gain differential amplifier (not shown). In an analog implementation of the defect detect detection circuitry, the gain control circuitry 314 may be implemented as a conventional analog automatic gain control (AGC) device, in which the gain signal is provided to the defect detection circuitry 316 as the threshold signal. Furthermore, in an analog implementation, the analog signal PFILT may be used as the substitute pixel value.

After a pixel is determined to be defective, it is corrected by value substitution derived from neighboring nondefective pixels. This can be accomplished using know techniques such as averaging the value of signal from all neighboring pixels and substituting this derived value in place of the defective pixel. This value to be substituted may be generated by other means, such as using the median of the surrounding pixel values or generating a histogram of the surrounding pixels and substituting the pixel value having the greater frequency of occurrence for the defective pixel. Alternatively, the substituted pixel value may be interpolated from any two or more of the neighboring pixel values. The neighboring pixels used by the defect detector and the defect substitution circuitry may not be the same. Either of these devices may use the immediately surrounding pixels or pixels extending for a predetermined number of pixel positions (e.g., 2–8) from the target pixel.

The exemplary defect substitution circuitry 318 described below includes two parts. The first part generates a corrected pixel value and a corresponding un-corrected value while the second part selects between the corrected and uncorrected values responsive to the defect signal DEF, provided by the defect detection circuitry 316, described above. In the described exemplary embodiments, the second part of the defect substitution circuitry is the same, and is shown in FIG. 7. Two different options are shown for the first part: a histogram circuit, shown in FIG. 5 and a filtering circuit, shown in FIGS. 6A and 6B.

Figure 5:
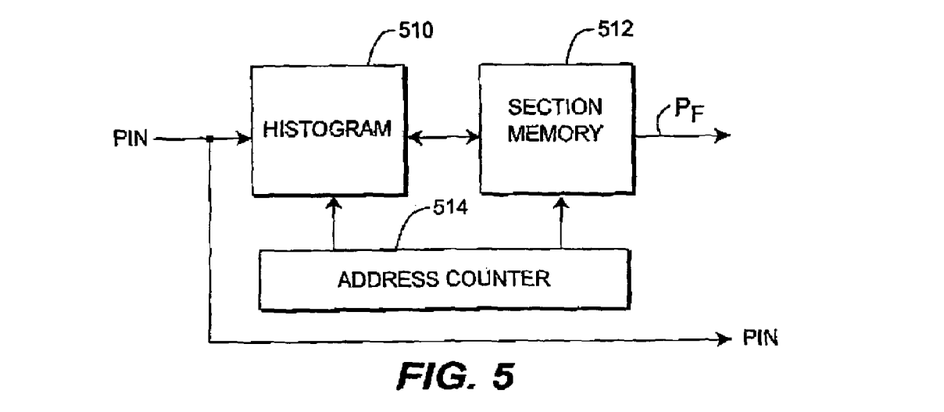
FIG. 5 is a block diagram of a portion of a first exemplary embodiment of circuitry suitable for use as the defect correction circuitry shown in FIG. 3.

FIG. 5 shows a histogram circuit that may be used to generate a substitute pixel value. The histogram circuit is similar to that described in U.S. patent to McCaffrey except that the image is divided into a plurality of regions and separate histogram statistics are maintained for each region of the image. As shown in FIG. 5, the exemplary histogram circuit includes a histogram generator 510 and a section memory 512. Both of these devices are coupled to receive address signals from an address counter 514. At any given time, the address signal is the address of the pixel value PIN currently being applied to the histogram generator 510. The exemplary histogram generator 510 monitors pixel values in each of the defined regions of the image, responsive to the address values provided by the address generator, and stores statistics on the frequency of occurrence of each value in the section memory 512. The output signal PF of the section memory 512 is the most frequently occurring value for the current section.

The exemplary histogram circuit shown in FIG. 5 assumes that the image data in the current field or frame is roughly the same as the image data in the previous field or frame because, when a new image is processed, the image data stored in the section memory 512 is from the previous image field or frame. Consequently, this circuit may cause erroneous pixel values to be produced for rapidly moving objects or immediately after scene changes. For most image data, defects of this type are acceptable because they are of short duration and are typically masked by the movement in the image or the scene change. It is contemplated that these defects may be eliminated by delaying the signal PIN by one field or frame time, in parallel with the histogram generating circuitry, so that the statistics accumulated in the section memory 512 match the output signal PIN.

Figures 6A, 6B:
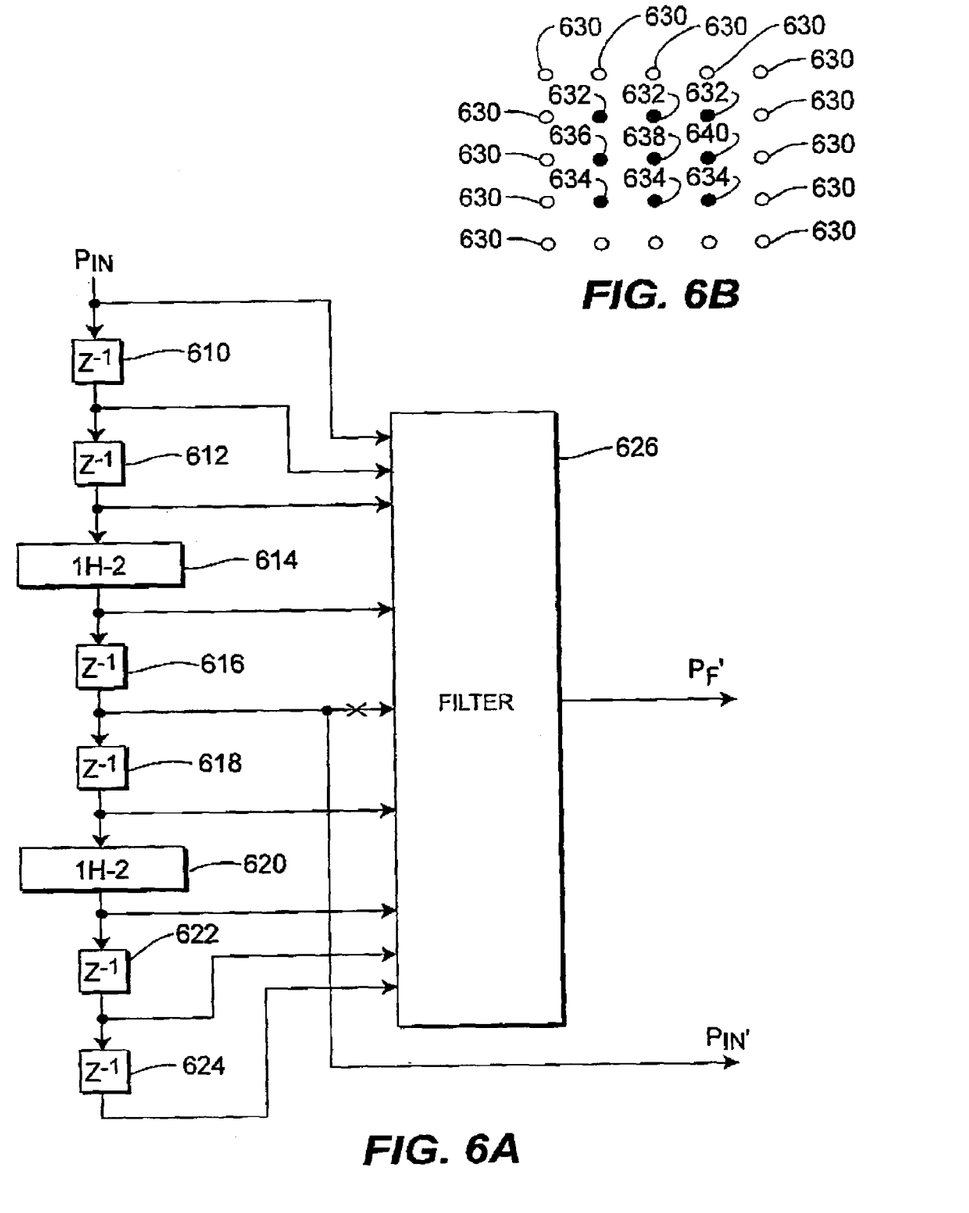
FIG. 6A is a block diagram of a portion of a second exemplary embodiment of circuitry suitable for use as the defect correction circuitry shown in FIG. 3.
FIG. 6B is a pixel diagram that is useful for describing the operation of the circuits shown in FIG. 6A.
Figure 7:
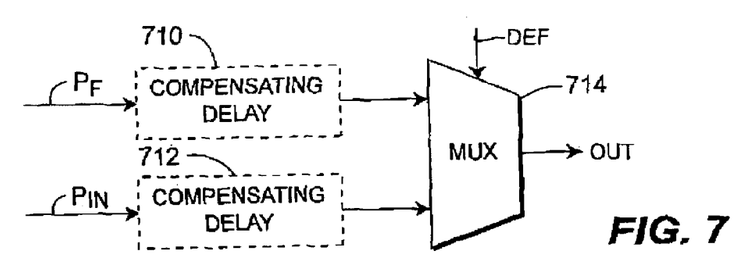
FIG. 7 is a block diagram of a second portion of the defect correction circuitry suitable for use with the embodiments shown in FIGS. 5 and 6A.

Another exemplary circuit for generating substitute pixel values is shown in FIGS. 6A and 6B. FIG. 6A shows an exemplary circuit while FIG. 6B is a pixel layout which shows the relative positions in an image of the pixels that are to be filtered. With reference to FIG. 6B, the circuit shown in FIG. 6A generates a substitute pixel value for a target pixel 638 by filtering the surrounding pixel values 632, 634 and 640. It is contemplated that the target pixel value 638 may or may not be included among the filtered pixel values. The target pixel 638 and its surrounding pixels are provided by the cascade connected delay elements 610, 612, 614, 616, 618, 620, 622 and 624, shown in FIG. 6A. The pixels 632 shown in FIG. 6B are provided by the delay elements 624, 622 and 620. The pixels 636, 638 and 640 are provided by the delay elements 618, 616 and 614 while the pixels 634 are provided by the delay elements 612 and 610 with the right-most pixel 634 being the input pixel PIN. Each of the delay elements 610, 612, 616, 618, 622 and 624 is a one pixel period delay. Delay elements 614 and 620 each provides a delay of one horizontal line interval minus two pixel periods.

The pixel value PIN and the pixel values provided by the delay elements 610, 612, 614, 616, 618, 620, 622 and 624 are applied to a filter 626. The filter 626 used in the exemplary embodiment of the invention may be a simple averaging filter, a median filter, an interpolation filter or a low-pass filter. If the filter 426 is a low-pass filter, it may have a frequency response characteristic corresponding to the spatial frequency spectrum of the optics 110, shown in FIG. 1. As shown by the "x" on the filter input line from the delay element 616, it is contemplated that the target pixel value 638 may or may not be included among the filtered pixel values. The output signal of the filter is a signal PF' which is the substitute pixel value. The filter also provides the signal PIN, delayed by one horizontal line time plus one pixel period (i.e. the pixel 638) as an output signal PIN'. This pixel value is the unmodified pixel value that corresponds in position in the image to the pixel value provided by the filter 626.

As an alternative to using the filter shown in FIG. 6A, the substitute pixel value may be the pixel value PFILT provided by the exemplary defect detection circuitry 316, shown in FIG. 4. In this instance, the unmodified pixel value may be the pixel Po provided by the delay element 414, also shown in FIG. 4.

FIG. 7 shows the circuitry which may be used with the circuitry shown in FIGS. 5 or 6A or with the signals PFILT and Po generated by the circuitry shown in FIG. 4 to provide the output signal, OUT, of the imaging system 100, as shown in FIG. 3. The combination of the circuitry shown in FIG. 5 or 6A and the circuitry shown in FIG. 7 produces the defect substitution circuit 316, shown in FIG. 3. Alternatively, if the signals PFILT and Po from the defect detection circuitry 316 are used as the modified and unmodified pixel values, as shown in phantom in FIG. 3, the circuitry shown in FIG. 7 may constitute the defect substitution circuitry 318. In this instance, the signal PIN would not be needed by the defect substitution circuitry 318, as indicated by the "x" in FIG. 3.

The circuitry shown in FIG. 7 includes two optional compensating delay elements 710 and 712 and a multiplexer 714. The delay element 710 is coupled to receive a modified pixel signal (e.g. PF, PF' or PFILT) while the delay element 712 is coupled to receive the corresponding unmodified pixel value (e.g. PIN, PIN' or Po). The delay elements 710 and 712 compensate for any difference in processing delay between the defect detection circuitry 316 and the defect substitution circuitry 318. These delay elements ensure that the signal DEF provided by the defect detection circuitry 316 to the control input terminal of the multiplexer 714 corresponds to the pixel position of the pixel signals provided to the two signal input ports of the multiplexer. While the compensating delay elements are shown as being applied to the defect substitution circuitry 318, it is contemplated that a single compensating delay element (not shown) may be used, instead, to provide the signal PIN to the defect detection circuitry when the processing delay through the defect substitution circuitry 318 is greater than the delay through the defect detection circuitry 316.

When the signal DEF indicates that the defect detection circuitry has detected a defective pixel, the multiplexer 714 passes the modified pixel value (e.g. PF, PF' or PFILT). When no defect is indicated, the multiplexer 714 passes the unmodified pixel value (e.g. PIN, PIN' or Po).

Thus there is provided by the present invention a video imaging system having real time on-chip detection and correction which is controlled by the gain applied to the detected video signal. This system requires no user intervention and can significantly reduce the cost of CMOS image sensors through increased yield of usable imager arrays. The imager array appears defect free as soon as it is turned on. Because the pixel defect detection is performed in real time and does not depend on data stored in memory, the decision whether or not to correct a pixel is made for each pixel once per frame. This allows defect detection threshold to be based on factors, such as scene brightness and imager temperature. The imager self corrects pixels as required. Because the circuitry corrects pixels based only on their current state and the current state of the surrounding pixels, the circuitry may be used to correct transient errors such as those generated by gamma rays.

When the defect detection circuit 316 is implemented using analog circuitry, the defect substitution circuitry 318 may include an analog multiplexer (not shown) formed, for example by two three-state circuits having a common output terminal. One of the three-state circuits may be coupled to receive the signal Po, provided by the sample-and-hold circuit 414 while the other circuit is coupled to receive the signal PFILT provided by the summing junction 442. In this implementation, the circuit for the signal that is not selected would be held in a high-impedance state.

While the invention has been described in terms of an exemplary embodiment, it is contemplated that it may be practiced as described above with variations within the scope of the appended claims.

What is claimed is:

1. A video imaging system comprising:
a substrate of a semiconductor material;
an imaging array formed in said substrate and having a plurality of picture elements (pixels) each pixel being adapted to receive light and convert the light to an electrical signal, said imaging array having an output port for providing the electrical signals from the pixels representing an active video image;
a first circuit formed in said substrate and connected to receive the pixel signals and for analyzing the pixel signals to provide a defective pixel output signal indicating if any one pixel of the plurality of pixels in the imaging array is defective, as the pixel signal corresponding to the one pixel is processed by the first circuit,
wherein said first circuit includes a filter that is responsive to a plurality of pixel values adjacent to the one pixel to provide an output signal, and circuitry including a comparator which compares the one pixel and to the output signal of the filter to determine if the one pixel is defective.

2. A video imaging system in accordance with claim 1, wherein the comparator further includes hysteresis circuitry that establishes a range of values including a value of the output signal of the filter and indicates that the one pixel is defective only when the one pixel has a value that is outside of the range of values.

3. A video imaging system in accordance with claim 2 further comprising a gain control circuit, formed in said substrate, the gain control circuit providing a camera pixel gain control output signal, wherein the hysteresis circuitry is responsive to the gain control output signal for establishing the range of values.

4. A video imaging system in accordance with claim 1 wherein:
the imager further includes optics for focusing an image onto the imaging array, the optics having a modulation transfer function (MTF); and
the filter has a frequency response characteristic that approximates the MTF of the optics.

5. A video imaging system in accordance with claim 1, wherein the filter is an averaging filter that averages the plurality of adjacent pixel values to produce the output signal.

6. A video imaging system in accordance with claim 1 further comprising a second circuit, formed in said substrate, coupled to receive the defective pixel output signal, the one pixel and a corrected version of the one pixel, the second circuit providing the corrected pixel when the defective pixel output signal indicates that the one pixel is defective.

7. A video imaging system in accordance with claim 6, wherein the second circuit further comprises a histogramming circuit, which generates the corrected pixel from the pixel signals provided by the imaging array.

8. A video imaging system in accordance with claim 6, wherein the second circuit is coupled to the first circuit to receive the output signal of the filter as the corrected pixel.

9. An video imaging system in accordance with claim 6 in which the imaging array is a CMOS imager and the first and second circuits are CMOS circuits formed concurrently with the CMOS imager.

10. A method for processing video signals representing at least one video image, each video image including a plurality of picture element (pixel) signals, the method comprising the steps of:
analyzing the pixel signals to provide a defective pixel output signal indicating if any one pixel of the plurality of pixels in the at least one video image is defective, including the steps of:
filtering a plurality of pixel values adjacent to the one pixel in the at least one video image to provide an output signal;
processing the output signal to establish a range of values including the output signal; and
comparing the one pixel to the range of values to provide a defective pixel output signal if the one pixel has a value outside of the range of values.

11. A method for processing video signals in accordance with claim 10 further comprising the steps of:

modifying the pixel signals in magnitude responsive to a gain control signal; and modifying the range of values responsive to the gain control signal.

12. A method for processing video signals in accordance with claim 10, wherein the video images are formed in accordance with a modulation transfer function (MTF); and the step of filtering the plurality of pixel values adjacent to the one pixel value includes the step of filtering the plurality of pixel values with a frequency response characteristic that approximates the MTF to produce the output signal.

13. A method for processing video signals in accordance with claim 10, wherein the video images are formed in accordance with a modulation transfer function (MTF); and the step of filtering the plurality of pixel values adjacent to the one pixel value includes the step of averaging the plurality of adjacent pixel values to produce the output signal.

14. A method for processing video signals in accordance with claim 10, further including the step of replacing the one pixel with a corrected version of the one pixel when the defective pixel output signal indicates that the one pixel is defective.

15. A method for processing video signals in accordance with claim 14, further includes the step of generating a histogram of the pixels in at least a portion of the video image including the one pixel and selecting a most frequently occurring pixel to generate the corrected version of the one pixel.

16. A method for processing video signals in accordance with claim 14, further includes the step of filtering the plurality of pixels to generate the corrected pixel.

17. A method for processing video signals in accordance with claim 14, further including the step of applying the output signal of the filtering step as the corrected pixel.

* * * * *